(12) United States Patent
Kim

(10) Patent No.: US 12,483,118 B2
(45) Date of Patent: Nov. 25, 2025

(54) POWER MANAGEMENT CIRCUIT, DISPLAY DEVICE, AND DRIVING METHOD FOR DISPLAY DEVICE

(71) Applicant: LG Display Co., Ltd., Seoul (KR)

(72) Inventor: Namsu Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/825,341

(22) Filed: Sep. 5, 2024

(65) Prior Publication Data

US 2025/0105725 A1 Mar. 27, 2025

(51) Int. Cl.
*H02M 1/32* (2007.01)
*G09G 3/3233* (2016.01)
*H02M 3/156* (2006.01)

(52) U.S. Cl.
CPC .......... *H02M 1/325* (2021.05); *G09G 3/3233* (2013.01); *H02M 3/156* (2013.01); *G09G 2330/021* (2013.01); *G09G 2330/025* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2017/0222550 A1* | 8/2017 | Chan | G05F 1/56 |
| 2019/0334428 A1* | 10/2019 | Arima | H02M 3/33507 |
| 2021/0249955 A1* | 8/2021 | Routledge | H02M 3/158 |
| 2024/0235366 A1* | 7/2024 | Huang | H02M 1/0019 |

* cited by examiner

*Primary Examiner* — Christopher J Kohlman
(74) *Attorney, Agent, or Firm* — Morgan, Lewis & Bockius LLP

(57) ABSTRACT

A power management circuit includes: a direct current voltage converter configured to generate an output voltage based on a first input voltage and to output the output voltage to an output node; and a feedback circuit configured to generate a feedback signal based on the output voltage output to the output node. The feedback circuit may include: an amplifier configured to compare a second input voltage supplied to a first input terminal and a voltage supplied to a second input terminal and to output a first comparison signal; a feedback signal output circuit configured to output a feedback signal based on the first comparison signal; and a resistance control circuit electrically connected between the first input terminal and the output node. The resistance control circuit may be configured to adjust a resistance value between the first input terminal and the output node based on a safe mode signal.

20 Claims, 10 Drawing Sheets

POWER MANAGEMENT CIRCUIT, DISPLAY DEVICE, AND DRIVING METHOD FOR DISPLAY DEVICE

CROSS REFERENCE TO RELATED APPLICATION

This application claims priority from Korean Patent Application No. 10-2023-0127191, filed on Sep. 22, 2023, which is hereby incorporated by reference for all purposes as if fully set forth herein.

TECHNICAL FIELD

Embodiments of the present disclosure relate to a power management circuit, a display device, and a driving method of a display device.

BACKGROUND

As the information society develops, there is increasing the demand for display devices for displaying images in various forms. Therefore, in recent years, there have been used various display devices such as liquid crystal displays and organic light emitting display devices.

A display device may include a power management circuit which generates and supplies power.

A load connected to the power management circuit may receive an output voltage from the power management circuit, and may be driven using the output voltage.

SUMMARY

If overcurrent occurs in the load, the operation of the power management circuit may be stopped.

In this case, the display device may be suddenly shut down, and as a result, there may be not performed a normal stopping operation.

Accordingly, the present disclosure is directed to a power management circuit, a display device, and a driving method of a display device that substantially obviate one or more of the problems due to limitations and disadvantages of the related art.

Embodiments of the present disclosure may provide a power management circuit, a display device, and a driving method of a display device capable of operating in a safe mode when overcurrent occurs.

Embodiments of the present disclosure may provide a power management circuit, a display device, and a driving method of a display device capable of stably outputting an output voltage from a DC voltage converter.

Embodiments of the present disclosure may provide a power management circuit, a display device, and a driving method of a display device capable of low power consumption by operating in safe mode when overcurrent occurs.

The objects of the present disclosure are not limited to the above-described objects, and other objects not mentioned can be clearly understood by those skilled in the art from the following description.

To achieve these objects and other advantages of the present disclosure, as embodied and broadly described herein, a power management circuit may include: a direct current voltage converter configured to generate an output voltage based on a first input voltage and to output the output voltage to an output node; and a feedback circuit configured to generate a feedback signal based on the output voltage output to the output node. The feedback circuit may include: an amplifier configured to compare a second input voltage supplied to a first input terminal and a voltage supplied to a second input terminal and to output a first comparison signal; a feedback signal output circuit configured to output a feedback signal based on the first comparison signal; and a resistance control circuit electrically connected between the first input terminal and the output node. The resistance control circuit may be configured to adjust a resistance value between the first input terminal and the output node based on a safe mode signal.

In another aspect of the present disclosure, a display device may include a display panel including a plurality of subpixels and a power management circuit configured to supply power to the subpixels. The power management circuit may include: a direct current voltage converter configured to generate an output voltage based on a first input voltage and to output the output voltage to an output node; and a feedback circuit configured to generate a feedback signal based on the output voltage output to the output node. The feedback circuit may include: an amplifier configured to compare a second input voltage supplied to a first input terminal and a voltage supplied to a second input terminal and to output a first comparison signal; a feedback signal output circuit configured to output a feedback signal based on the first comparison signal; and a resistance control circuit electrically connected between the first input terminal and the output node. The resistance control circuit may be configured to adjust a resistance value between the first input terminal and the output node based on a safe mode signal.

In yet another aspect of the present disclosure, a driving method of a display device may include: outputting a safe mode signal, by a safe mode driving circuit, after receiving an overcurrent pulse signal; adjusting a resistance value, by a resistance control circuit receiving the safe mode signal; outputting a feedback signal, by a feedback circuit including the resistance control circuit; and lowering a voltage level of an output voltage, by a direct current voltage converter supplied with the feedback signal.

According to embodiments of the present disclosure, there may provide a power management circuit, a display device, and a driving method of a display device capable of operating in a safe mode when overcurrent occurs.

According to embodiments of the present disclosure, there may provide a power management circuit, a display device, and a driving method of a display device capable of stably outputting an output voltage from a DC voltage converter.

According to embodiments of the present disclosure, there may provide a power management circuit, a display device, and a driving method of a display device capable of low power consumption by operating in safe mode when overcurrent occurs.

The advantages and effects according to the present disclosure are not limited to those described above, and additional advantages and effects are included in or may be obtained from the present disclosure.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure.

DETAILED DESCRIPTION

Figure 1:
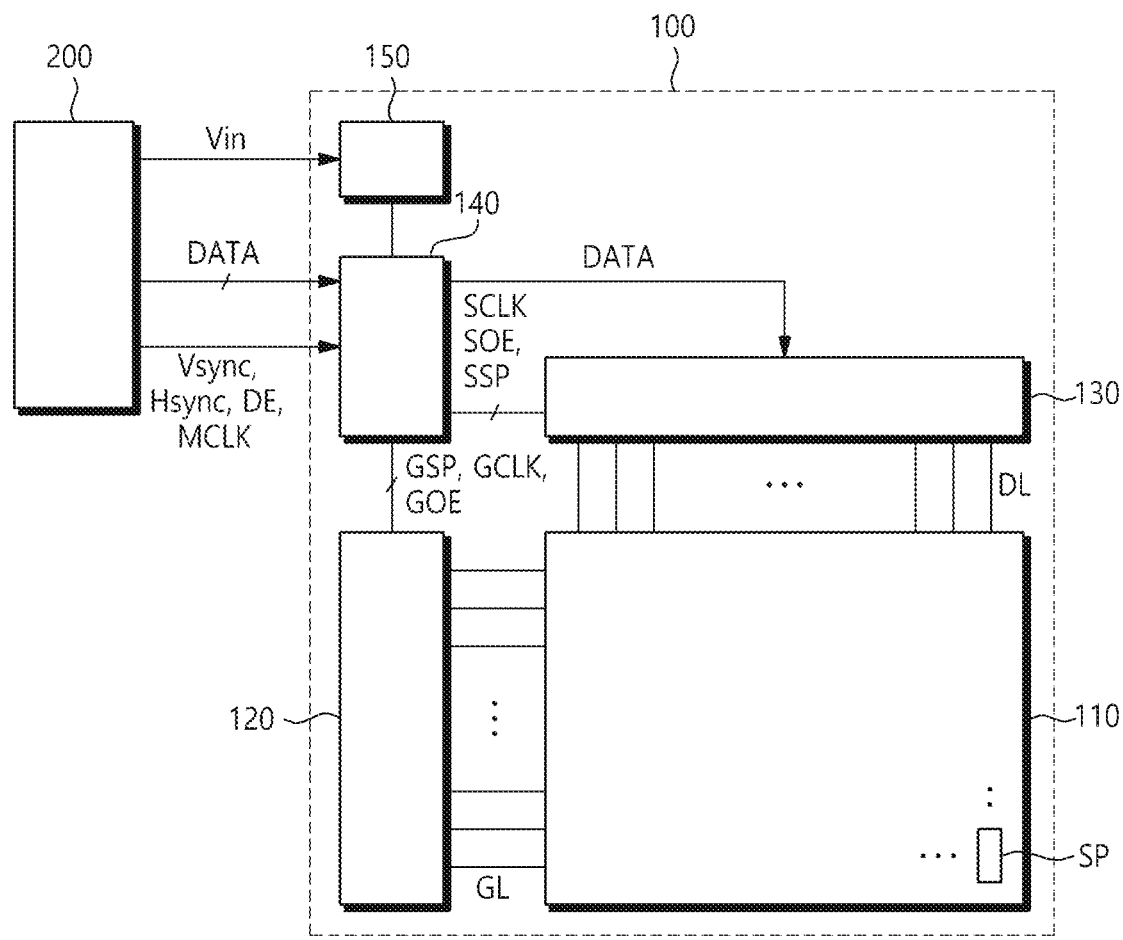
FIG. 1 illustrates a schematic configuration of a display device according to embodiments of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

In the following description, where a detailed description of a relevant known function or configuration may unnecessarily obscure aspects of the present disclosure, a detailed description of such a known function or configuration may be omitted or be briefly discussed.

Where a term like "include," "have," "contain," "constitute," "make up of," or "formed of" is used, one or more other elements may be added unless the term is used with a more limiting term, such as "only." An element described in a singular form may include a plurality of elements, and vice versa, unless the context clearly indicates otherwise.

Although terms "first," "second," "A," "B," "(A)," "(B)," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

Where a description is provided that a first element "is connected or coupled to," "contacts or overlaps" a second element, or the like, it should be interpreted that, not only can the first element "be directly connected or coupled to" or "directly contact or overlap" the second element, but a third element can also be "interposed" between the first and second elements, or the first and second elements can "be connected or coupled to," "contact or overlap," each other via a fourth element. Here, the second element may be included in at least one of two or more elements that "are connected or coupled to," "contact or overlap," each other.

Where time relative terms, such as "after," "subsequent to," "next," "before," and the like, are used to describe processes or operations of elements or configurations, or flows or steps in operating, processing, or manufacturing methods, these terms may be used to describe non-consecutive or non-sequential processes or operations unless the terms are used with a more limiting term line "directly" or "immediately."

In addition, where any dimensions, relative sizes, and the like are described, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure are described in detail with reference to the accompanying drawings.

FIG. 1 illustrates a schematic configuration of a display device 100 according to embodiments of the present disclosure.

As shown in FIG. 1, a display device 100 according to embodiments of the present disclosure may include a display panel 110 in which a plurality of gate lines GL and data lines DL are disposed and a plurality of subpixels SP are arranged in a matrix form, a gate driving circuit 120 for driving the plurality of gate lines GL, a data driving circuit 130 for supplying data voltage through the plurality of data lines DL, a controller 140 for controlling the data driving circuit 120 and the data driving circuit 130, and a power management circuit 150.

The display panel 110 may display the image based on a scan signal transmitted from the gate driving circuit 120 through a plurality of gate lines GL and a data voltage transmitted from the data driving circuit 130 through a plurality of data lines DL.

In the case of an organic light emitting display, the display panel 110 may be implemented as a top emission method, a bottom emission method, or a dual emission method.

The display panel 110 may include a plurality of pixels arranged in a matrix form, and each pixel may include subpixels SP of different colors, for example, a white subpixel, a red subpixel, a green subpixel, and a blue subpixel. In addition, each subpixel SP may be defined by a plurality of data lines DL and a plurality of gate lines GL.

One subpixel SP may include a thin film transistor TFT formed in the area where one data line DL and one gate line GL intersect, a light emitting device such as an organic light emitting diode which charges the data voltage, and a storage capacitor electrically connected to the light emitting device to maintain a voltage.

For example, in the case that a display device 100 with a resolution of 2160×3840 includes four subpixels of white (W), red (R), green (G), and blue (B), there may be provided 2,160 gate lines GL and a total of 3,840×4=15,360 data lines DL by and 3,840 data lines DL each connected to 4 subpixels (WRGB). A subpixel SP may be disposed at each point where the gate line GL and the data line DL intersect.

The gate driving circuit 120 may be controlled by the controller 140, and sequentially output scan signals to a plurality of gate lines GL arranged on the display panel 110 to control the driving timing for a plurality of subpixels SP.

In this case, the gate driving circuit 120 may include one or more gate driving integrated circuits GDIC, and may be located only on one side of the display panel 110 or may be located on both sides of the display panel 110 depending on the driving method. Alternatively, the gate driving circuit 120 may be embedded in a bezel area of the display panel 110 to be implemented in a gate-in-panel (GIP) type.

The data driving circuit 130 may receive image data DATA from the controller 140, and convert the received image data DATA into an analog data voltage. Then, the data driving circuit 130 may output a data voltage to each data line DL in accordance with the timing of applying the scan signal through the gate line GL, so that each subpixel SP connected to the data line DL may display a light with brightness corresponding to the data voltage.

Similarly, the data driving circuit 130 may include one or more source driving integrated circuits SDICs, and the source driving integrated circuit SDIC may be connected to a bonding pad of the display panel 110 using a tape automated bonding (TAB) method or a chip-on-glass (COG) method, or may be disposed directly on the display panel 110.

Depending on the case, each source driving integrated circuit SDIC may be integrated and disposed on the display panel 110. In addition, each source driving integrated circuit SDIC may be implemented in a chip-on-film (COF) method. In this case, each source driving integrated circuit SDIC may be mounted on a circuit film, and may be electrically connected to the data line DL of the display panel 110 through a circuit film.

The controller 140 may supply various control signals to the gate driving circuit 120 and the data driving circuit 130, and control the operations of the gate driving circuit 120 and the data driving circuit 130. That is, the controller 140 may control the gate driving circuit 120 to output a scan signal according to the timing implemented in each frame, and may transmit image data DATA received from the outside to the data driving circuit 130.

In this case, the controller 140 may receive image data DATA and various timing signals, including a vertical synchronization signal Vsync, a horizontal synchronization signal Hsync, a data enable DE signal, and a main clock MCLK from the external host system 200.

The host system 200 may be any one of a television system, a set-top box, a navigation system, a personal computer (PC), a home theater system, a mobile device, and a wearable device.

Accordingly, the controller 140 may generate a control signal using various timing signals received from the host system 200, and transmit the timing signal to the gate driving circuit 120 and the data driving circuit 130.

For example, in order to control the gate driving circuit 120, the controller 140 may output various gate control signals, including a gate start pulse signal GSP, a gate clock GCLK, and a gate output enable signal GOE. Here, the gate start pulse GSP may control the operation start timing of one or more gate driving integrated circuits GDIC constituting the gate driving circuit 120. Additionally, the gate clock GCLK is a clock signal commonly input to one or more gate driving integrated circuits GDIC, and may control the shift timing of the scan signal. Additionally, the gate output enable signal GOE may specify timing information of one or more gate driver integrated circuits GDIC.

In addition, in order to control the data driving circuit 130, the controller 140 may output various data control signals such as a source start pulse SSP, a source sampling clock SCLK, and a source output enable signal SOE. Here, the source start pulse SSP may control the timing at which one or more source driving integrated circuits SDICs constituting the data driving circuit 130 start sampling data. The source sampling clock SCLK is a clock signal which controls the timing of sampling data in a source driving integrated circuit SDIC. The source output enable signal SOE may control the output timing of the data driving circuit 130.

The display device 100 may include a power management circuit 150 which supplies various voltages or currents to the display panel 110, the gate driving circuit 120, and the data driving circuit 130, or controls the various voltages or currents to be supplied.

The power management circuit 150 may adjust the direct current input voltage Vin supplied from the host system 200 to generate the power required to drive the display panel 100, the gate driving circuit 120, and the data driving circuit 130. The power management circuit 150 may be referred to as a power management integrated circuit PMIC.

Meanwhile, the subpixel SP may be located at a point where the gate line GL and the data line DL intersect, and a light emitting device may be disposed in each subpixel SP. For example, an organic light emitting display device may include a light emitting device such as an organic light emitting diode in each subpixel SP, and may display an image by controlling the current flowing through the light emitting device according to the data voltage.

The display device 100 may be of various types such as a liquid crystal display, organic light emitting display, and plasma display panel.

Figure 2:
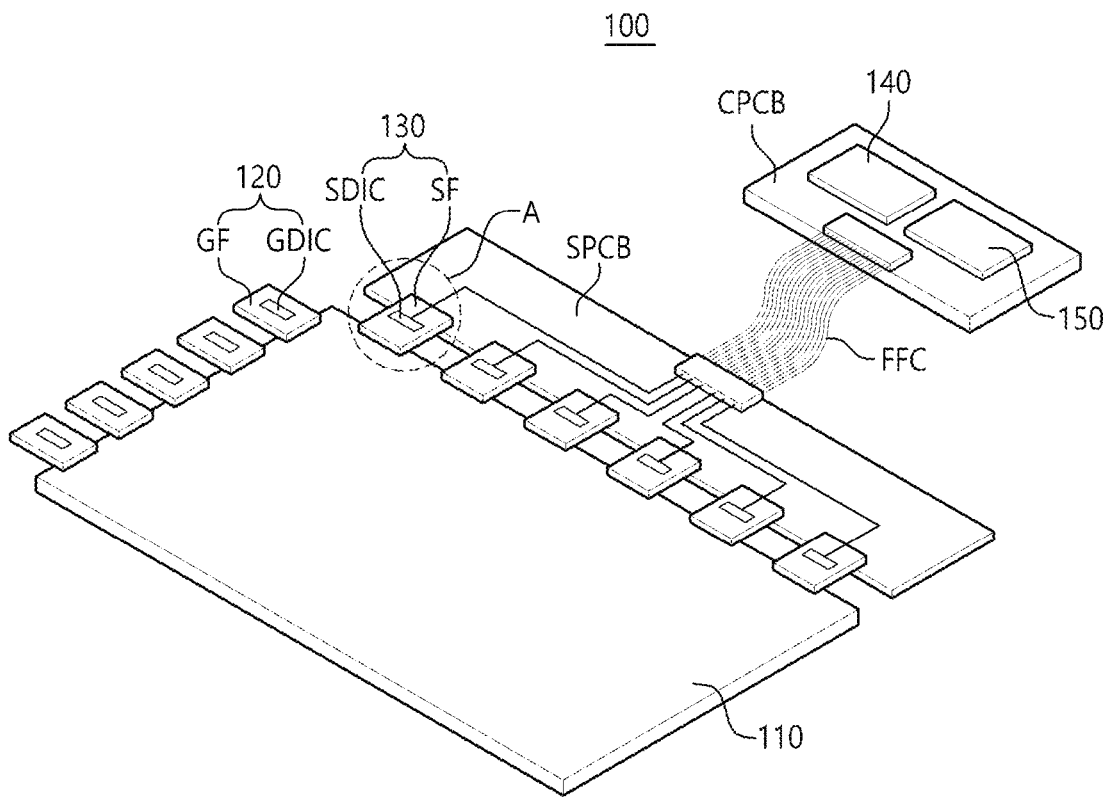
FIG. 2 is a system diagram of a display device according to embodiments of the present disclosure.

FIG. 2 is a system diagram of a display device 100 according to embodiments of the present disclosure.

FIG. 2 illustrates an example of a display device 100 according to embodiments of the present disclosure in which a source driving integrated circuit SDIC included in the data driving circuit 130 and a gate driving integrated circuit GDIC included in the gate driving circuit 120 are implemented in the chip-on-film (COF) method among various methods (TAB, COG, COF, etc.).

One or more gate driving integrated circuits GDIC included in the gate driving circuit 120 may each be mounted on a gate film GF, and one side of the gate film GF may be electrically connected to the display panel 110. In addition, there may be disposed the lines on the gate film GF for electrically connecting the gate driving integrated circuit GDIC and the display panel 110.

In this case, the gate driving circuit 120 may be located on only one side or both sides of the display panel 110 depending on the driving method. Alternatively, the gate driving circuit 120 may be embedded in the bezel area of the display panel 110, and implemented in a gate-in-panel (GIP) form.

Similarly, one or more source driving integrated circuits SDICs included in the data driving circuit 130 may each be mounted on the source film SF, and one side of the source film SF may be electrically connected to the display panel 110. Additionally, the lines for electrically connecting the source driving integrated circuit SDIC and the display panel 110 may be disposed on the source film SF.

The display device 100 may include at least one source printed circuit board SPCB and a control printed circuit board CPCB for mounting control components and various electrical devices for circuit connection between a plurality of source driving integrated circuits SDIC and other devices.

In this case, the other side of the source film SF on which the source driving integrated circuit SDIC is mounted may be connected to at least one source printed circuit board SPCB. That is, one side of the source film SF on which the source driving integrated circuit SDIC is mounted may be electrically connected to the display panel 110, and the other side may be electrically connected to the source printed circuit board SPCB.

A controller 140 and a power management circuit (e.g., power management IC) 150 may be mounted on a control printed circuit board CPCB. The controller 140 may control the operations of the data driving circuit 130 and the gate driving circuit 120. The power management circuit 150 may supply driving voltage or current to the display panel 110, the data driving circuit 130, and the gate driving circuit 120, and may control the supplied voltage or current.

At least one source printed circuit board SPCB and a control printed circuit board CPCB may be connected circuitly through at least one connection member, and the connection member may be, for example, a flexible printed circuit (FPC), a flexible flat cable (FFC), etc. In this case, the connection member connecting at least one source printed circuit board SPCB and the control printed circuit board CPCB may be variously modified depending on the size and type of the display device 100. Additionally, at least one source printed circuit board SPCB and a control printed circuit board CPCB may be integrated and implemented as one printed circuit board.

In the case of the display device 100 configured as above, the power management circuit 150 may transfer the driving voltage required for display driving or characteristic value sensing through a flexible printed circuit (FPC) or flexible flat cable (FFC) to the source printed circuit board SPCB. The driving voltage transferred to the source printed circuit board SPCB may be is supplied to emit or sense a specific subpixel SP in the display panel 110 through the source driving integrated circuit SDIC.

The power management circuit 150 may generate various voltages as an output voltage Vout based on the input voltage Vin. For example, the output voltage Vout may include a driving voltage VDD, a base voltage VSS, a reference voltage Vref, a gate high voltage VGH, a gate low voltage VGL, etc.

The voltage generated by the power management circuit 150 may be supplied to the display panel 110, the gate driving circuit 120, the data driving circuit 130, and the controller 140.

The power management circuit 150 may include a DC-DC converter to generate voltage. The power management circuit 150 may include a voltage change circuit such as a buck converter, a boost converter, or a buck-boost converter. A buck converter is a type of DC-DC converter, and may output by stepping down the input voltage. A boost converter is a type of DC-DC converter, and the boost converter may output by boosting the input voltage. A buck-boost converter is a type of DC-DC converter, and the buck-boost converter may output by stepping down or boosting the input voltage. The power management circuit 150 may generate a voltage by bypassing the input voltage Vin.

Figure 3:
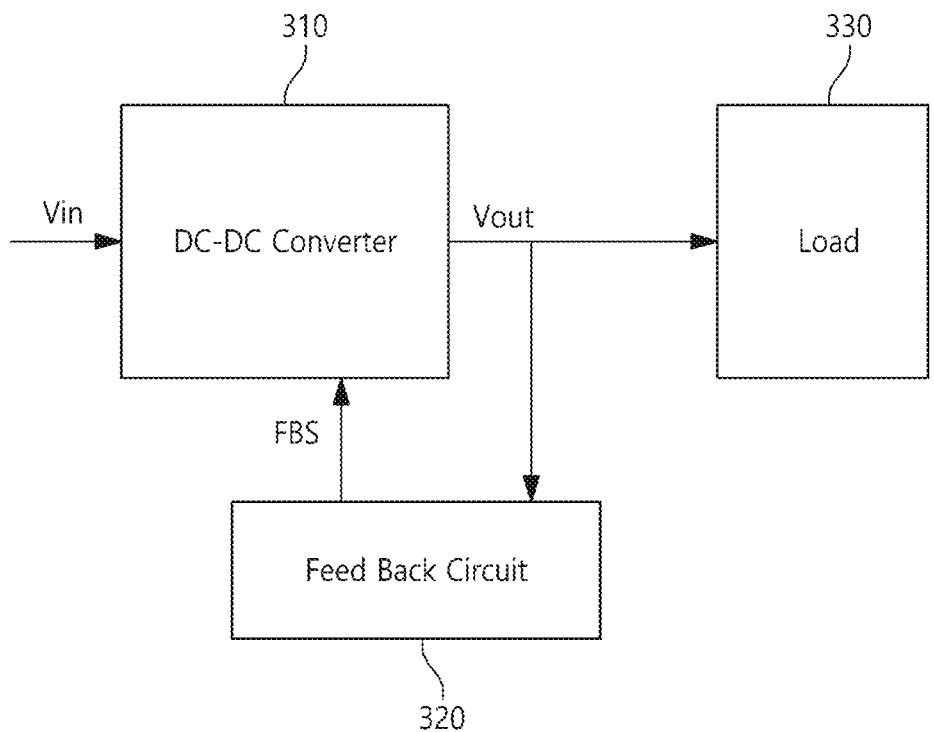
FIGS. 3 and 4 illustrate a direct current voltage converter, a feedback circuit, and a load according to embodiments of the present disclosure.
Figure 4:
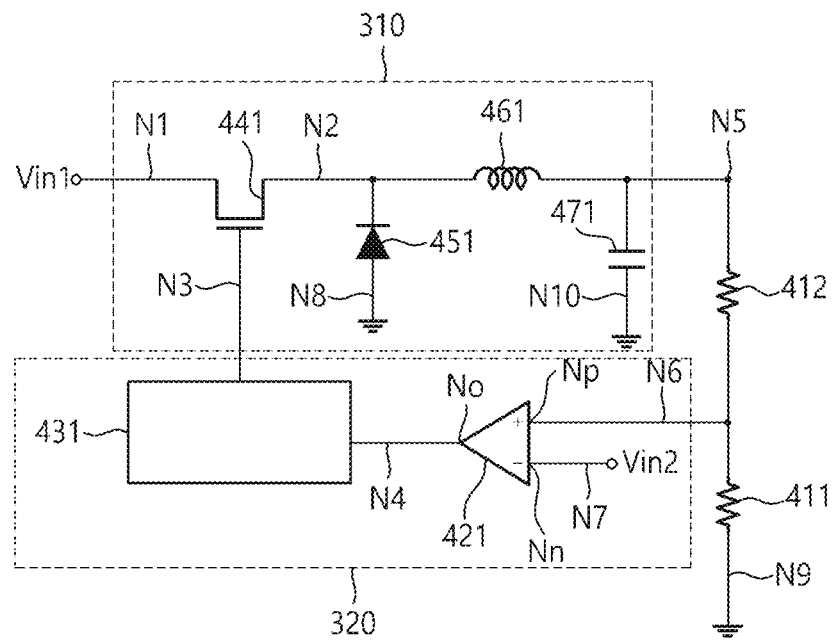

FIGS. 3 and 4 illustrate a direct current voltage converter 310, a feedback circuit 320, and a load according to embodiments of the present disclosure.

The power management circuit 150 may include a direct current voltage converter 310 and a feedback circuit 320.

The direct current (DC) voltage converter 310 may receive an input voltage Vin, and then generate an output voltage Vout based on the input voltage Vin. The output voltage Vout may be a stepped-up voltage or a step-down voltage based on the input voltage Vin.

The direct current voltage converter 310 may be a DC-DC converter. The direct current voltage converter 310 may be a buck converter, boost converter, buck boost converter, etc.

The DC voltage converter 310 may output an output voltage Vout. The output voltage Vout output from the DC voltage converter 310 may be supplied to the load 330.

In addition, the output voltage Vout output from the DC voltage converter 310 may be supplied to the feedback circuit 320.

The feedback circuit 320 may be a circuit which senses the output voltage Vout and supplies a feedback signal FBS to the DC voltage converter 310.

The DC voltage converter 310 receiving the feedback signal FBS may control a magnitude of the output voltage Vout. For example, the feedback signal FBS output from the feedback circuit 320 may be a pulse width modulated (PWM) signal. As a duty ratio of the PWM signal is adjusted, there may be controlled a magnitude of the output voltage Vout output from the DC voltage converter 310.

For convenience of explanation, hereinafter, it is assumed that the DC voltage converter 310 is a buck converter.

As shown in FIG. 4, there is illustrated the DC voltage converter which receives output voltage as feedback.

The DC voltage converter may output an output voltage. The DC voltage converter may receive a feedback signal for the output voltage from the feedback circuit 320. The DC voltage converter may control the output voltage based on the feedback signal. The DC voltage converter, which controls the output voltage according to the feedback signal, may be designed in various ways. FIG. 4 illustrates an example of the DC voltage converter.

As shown in FIG. 4, the DC voltage converter may include a first transistor 441, a first diode 451, a first inductor 461, and a first capacitor 471. The DC voltage converter may have the configuration of a general converter circuit.

The first transistor 441 may be electrically connected between a first node N1 and a second node N2. The input voltage Vin1 may be supplied to the first node N1. A gate node of the first transistor 441 may be electrically connected to a third node N3.

The first diode 451 may be electrically connected between the second node N2 and an eighth node N8. The eighth node N8 may be a node to which a ground voltage is supplied.

The first inductor 461 may be electrically connected between the second node N2 and a fifth node N5. The fifth node N5 may be a node where the output voltage Vout is output.

The first capacitor 471 may be electrically connected between the fifth node N5 and a tenth node N10. The tenth node N10 may be a node to which a ground voltage is supplied.

The feedback circuit 320 may include a first resistor 411, a second resistor 412, an amplifier 421, and a feedback signal output circuit 431. However, the feedback circuit 320 may include only the amplifier 421 and the feedback signal output circuit 431. Hereinafter, for convenience of explanation, the description will be made on the assumption that the feedback circuit 320 includes an amplifier 421 and a feedback signal output circuit 431.

The first resistor 411 may be electrically connected between a sixth node N6 and a ninth node N9.

The second resistor 412 may be electrically connected between the fifth node N5 and the sixth node N6.

The amplifier 421 may include a non-inverting terminal Np, an inverting terminal Nn, and an output terminal No.

The non-inverting terminal Np of the amplifier 421 may be electrically connected to the sixth node N6. The non-inverting terminal Np of the amplifier 421 may be electrically connected to the second resistor 412.

The inverting terminal Nn of the amplifier 421 may be electrically connected to a seventh node N7. A second input voltage Vin2 may be supplied to the seventh node N7. The inverting terminal Nn of the amplifier 421 may be supplied with the second input voltage Vin2.

Since the amplifier 421 is electrically connected to the first resistor 411 and the second resistor 412, there may be operated as a comparator circuit. The amplifier 421 may operate as a comparator circuit, and the output terminal No of the amplifier 421 may output a comparison signal. Depending on the comparison result, the comparison signal may be the second input voltage Vin2 or a voltage of the sixth node N6.

The feedback signal output circuit 431 may receive a comparison signal. The feedback signal output circuit 431 may output a feedback signal according to the comparison signal. The feedback signal may be a PWM signal. The PWM signal may be a signal with a duty ratio. Depending on the comparison result of the comparator circuit, the comparison signal may have a high or low duty ratio.

The feedback signal output by the feedback signal output circuit 431 may be supplied to the gate node of the first transistor 441. In the case that the feedback signal is a PWM signal, the DC voltage converter 310 may adjust the output voltage Vout based on the PWM signal.

The adjusted output voltage Vout may be supplied to the load 330 through the fifth node N5.

Meanwhile, the display device 100 may malfunction due to process errors, external shocks, or long-term use. If a malfunction occurs, overcurrent may be generated inside the display device 100. If overcurrent occurs, the display device 100 may malfunction. Alternatively, if overcurrent occurs, there may occur a risk such as fire due to malfunction of the display device 100.

In order to prevent malfunction of the display device 100 due to overcurrent, the display device 100 may include a configuration for blocking overcurrent. For example, overcurrent may be generated in the load 330 supplied with the output voltage Vout. In preparation for the occurrence of overcurrent, there may be provided a fuse or the like on the load 330 side. Alternatively, in order to prepare for overcurrent generated in the load 330, a fuse or other component may be disposed on the DC voltage converter 310 side. The component such as fuses may block the flow of current in case of the occurrence of overcurrent.

If the fuse operates in response to the occurrence of overcurrent, the display device 100 may be completely stopped. When the fuse operates and the display device 100 is stopped, there may be a problem in which the display device 100 cannot perform a normal stop operation.

In particular, in the case that the display device 100 is an essential component of a transportation device, a complete stoppage of the display device 100 due to a fuse operation may cause a great risk to the user. For example, when a transportation device is a vehicle, essential driving information of the vehicle may be displayed through the display device 100. In this case, if the display device 100 is completely shut down, the user will not be able to view the essential driving information of the vehicle. Accordingly, the user may be placed in a dangerous situation.

Accordingly, embodiments of the present disclosure may provide a power management circuit, a display device, and a method of driving the display device which can operate in a safe mode when overcurrent occurs.

Embodiments of the present disclosure may provide a power management circuit which stably outputs an output voltage from the DC voltage converter 310, a display device, and a method of driving the display device.

Accordingly, embodiments of the present disclosure may provide a power management circuit, a display device, and a method of driving the display device which enable low power consumption by operating in a safe mode when overcurrent occurs.

Figure 5:
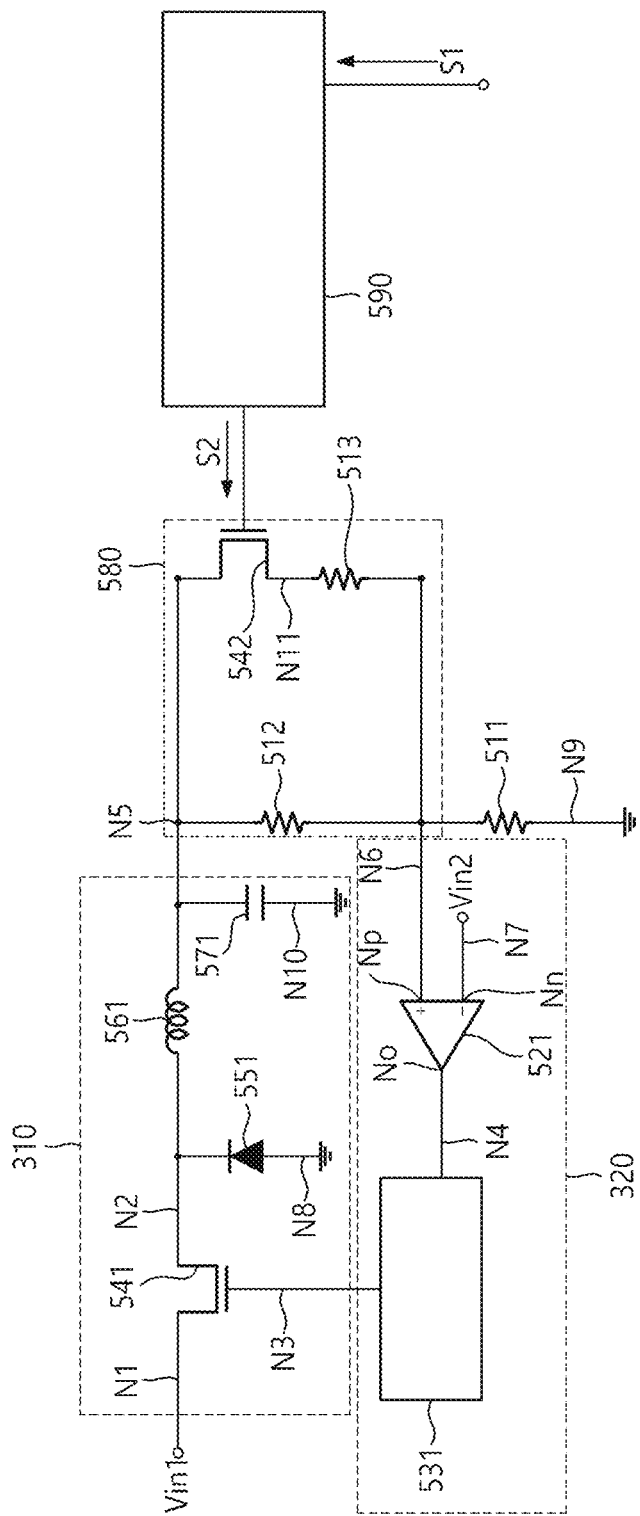
FIG. 5 illustrates a direct current voltage converter operating in a safe mode according to embodiments of the present disclosure.

FIG. 5 illustrates a direct current voltage converter 310 operating in a safe mode according to embodiments of the present disclosure.

In FIG. 5, there are illustrated a direct current (DC) voltage converter, a feedback circuit 320, a resistance control circuit 580, and a safe mode driving circuit 590.

As shown in FIG. 5, the DC voltage converter may include a first transistor 541, a first diode 551, a first inductor 561, and a first capacitor 571. The DC voltage converter shown in FIG. 5 may be the same as the DC voltage converter shown in FIG. 4.

As shown in FIG. 5, the feedback circuit 320 may include a resistance control circuit 580, a first resistor 511, an amplifier 521, and a feedback signal output circuit 531. The feedback circuit 320 shown in FIG. 5 may be the same as the feedback circuit 320 shown in FIG. 4.

As shown in FIG. 5, the resistance control circuit 580 may include a second resistor 512, a third resistor 513, and a second transistor 542.

The second resistor 512 may be electrically connected between a fifth node N5 and a sixth node N6.

The second transistor 542 may be electrically connected between the fifth node N5 and an eleventh node N11.

The third resistor 513 may be electrically connected between the eleventh node N11 and the sixth node N6.

As shown in FIG. 5, the safe mode driving circuit 590 may receive an overcurrent pulse signal S1, and then output a safe mode signal S2. The safe mode signal S2 may be a low level signal before receiving the overcurrent pulse signal S1. The safe mode signal S2 may become a high level signal after receiving the overcurrent pulse signal S1.

The resistance control circuit 580 may receive the safety mode signal S2, which is a high level signal. After the resistance control circuit 580 receives the safety mode signal S2 of the high level signal, the resistance control circuit 580 may adjust the resistance value between the fifth node N5 and the sixth node N6. A resistance value after adjustment may be smaller than a resistance value before adjustment.

As shown in FIG. 5, a gate node of the second transistor 542 may receive the safe mode signal S2.

If the safe mode signal S2, which is a low level signal, is supplied to the gate node of the second transistor 542, the second transistor 542 may be turned off.

If the safety mode signal S2, which is a high level signal, is supplied to the gate node of the second transistor 542, the second transistor 542 may be turned on.

That is, when the safety mode signal S2 for operating the safety mode is supplied to the gate node of the second transistor 542, the second transistor 542 may be switched from the turn-off state to the turn-on state.

As the second transistor 542 is switched to the turn-on state, the resistance value between the fifth node N5 and the sixth node N6 may decrease. As the resistance value between the fifth node N5 and the sixth node N6 decreases due to the parallel connection, a voltage across the first resistor 511 may be relatively increased. The relatively larger voltage across both ends of the first resistor 511 may be supplied to the non-inverting terminal Np of the amplifier 521.

There may be output a comparison signal based on the voltage across both ends of the relatively large first resistor 511. In addition, based on the above-described comparison signal, the feedback signal output circuit 531 may output a control signal that is a PWM signal with a relatively low duty ratio.

Accordingly, the DC voltage converter 310 may lower the output voltage Vout and output a relatively lower voltage. That is, the DC voltage converter 310 may output a voltage smaller than the output voltage Vout.

If the DC voltage converter 310 is designed as shown in FIG. 4, the display device 100 may suddenly stop due to a fuse blown in response to the overcurrent. However, since the direct current voltage converter 310 shown in FIG. 5 outputs a relatively smaller output voltage Vout for a specific period of time based on the safety mode signal S2, the display device 100 may operates stable for a certain period of time.

The safe mode driving circuit 590 may receive the overcurrent pulse signal S1, and then output a safe mode signal S2 to operate the safe mode, which can be designed using various methods.

Hereinafter, it will be described an embodiment of the safe mode driving circuit 590.

Figure 6:
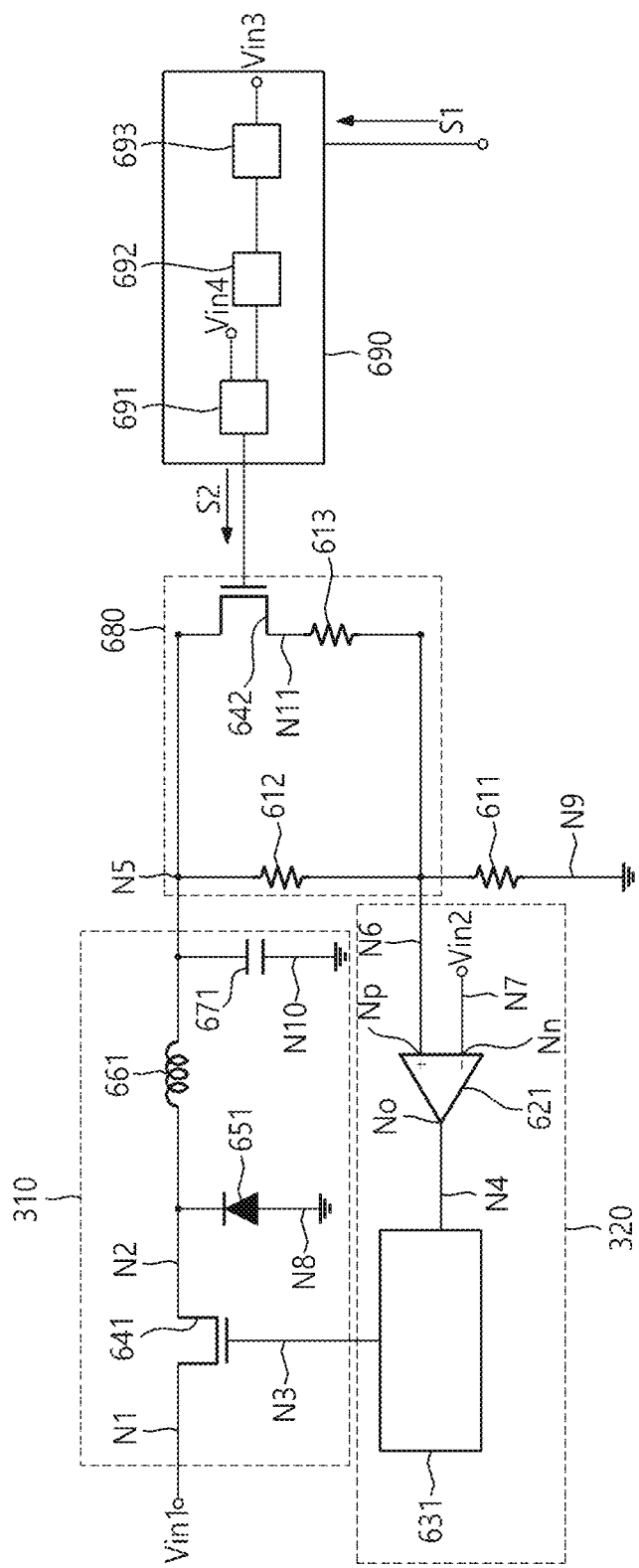
FIG. 6 is an example diagram of a direct current voltage converter operating in a safe mode according to embodiments of the present disclosure.

FIG. 6 is an example diagram of a direct current voltage converter 310 operating in a safe mode according to embodiments of the present disclosure.

As shown in FIG. 6, the DC voltage converter may include a first transistor 641, a first diode 651, a first inductor 661, and a first capacitor 671. The DC voltage converter shown in FIG. 6 may be the same as the DC voltage converter shown in FIG. 5.

As shown in FIG. 6, the feedback circuit 320 may include a resistance control circuit 680, a first resistor 611, an amplifier 621, and a feedback signal output circuit 631. The feedback circuit 320 shown in FIG. 6 may be the same as the feedback circuit 320 shown in FIG. 5.

As shown in FIG. 6, the resistance control circuit 680 may include a second resistor 612, a second transistor 642, and a third resistor 613. The resistance control circuit 680 shown in FIG. 6 may be the same as the resistance control circuit shown in FIG. 5.

As shown in FIG. 6, the safe mode driving circuit 690 may receive an overcurrent pulse signal S1, and then output a safe mode signal S2 to operate the safe mode.

The safe mode driving circuit 690 may include a comparator circuit 691, a driving time control circuit 692, and a safe mode initiation circuit 693.

The safe mode initiation circuit 693 may be supplied with an overcurrent pulse signal S1. The safe mode initiation circuit 693 may be supplied with a third input voltage Vin3.

Overcurrent generated from a load may be sensed through a sensing unit (not shown). If the overcurrent is not sensed, the overcurrent pulse signal S1 may be a low level signal. If overcurrent is sensed, the overcurrent pulse signal S1 may become a high level signal.

If the safe mode initiation circuit 693 receives the overcurrent pulse signal S1, which is a high level signal, the safe mode initiation circuit 693 may supply the third input voltage Vin3 to the driving time control circuit 692.

For example, the safe mode initiation circuit 693 may include a switch circuit, and the switch circuit may be switched to the turn-on state by the overcurrent pulse signal S1, which is a high level signal. As the switch circuit is turned on, the third input voltage Vin3 may be supplied to the driving time control circuit 692.

The driving time control circuit 692 may output a driving time control signal after receiving the third input voltage Vin3.

The driving time control signal may have a voltage level greater than a safe mode reference voltage level. The safe mode reference voltage level may be a voltage level which causes the comparator circuit 691 to output the safe mode signal S2, which is a high level signal.

The period during which the driving time control signal is output and the period during which the safe mode is operated may be the same. Alternatively, the period during which the safe mode is operated may be the same as the period during which the driving time control signal is output within a certain range.

The comparator circuit 691 may be supplied with a driving time control signal and a fourth input voltage Vin4. The comparator circuit 691 may compare the fourth input voltage Vin4 and the driving time control signal. The comparator circuit 691 may output the safe mode signal S2 based on a comparison result between the fourth input voltage Vin4 and the driving time control signal.

If the driving time control signal has a voltage level greater than the safe mode reference voltage level, the comparator circuit 691 may output the safe mode signal S2 of a high level signal.

Figure 7:
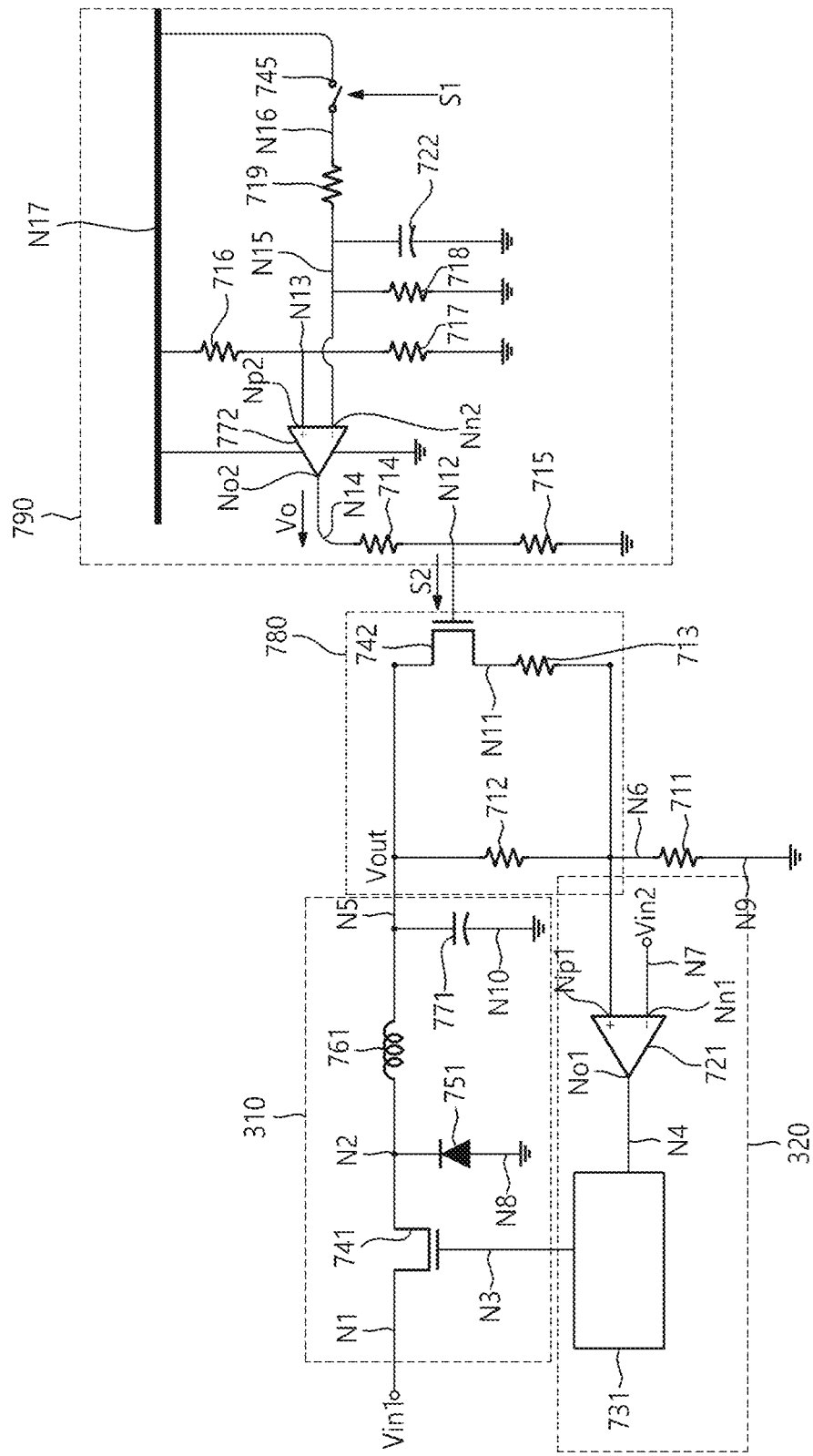
FIG. 7 is an example diagram of a direct current voltage converter operating in a safe mode according to embodiments of the present disclosure.

The comparator circuit 691, the driving time control circuit 692, and the safe mode initiation circuit 693 may be designed in various ways to perform their respective functions. As shown in FIG. 7, there are illustrated the circuits for an example of each of the comparator circuit 691, the driving time control circuit 692, and the safe mode initiation circuit 693.

Figure 8:
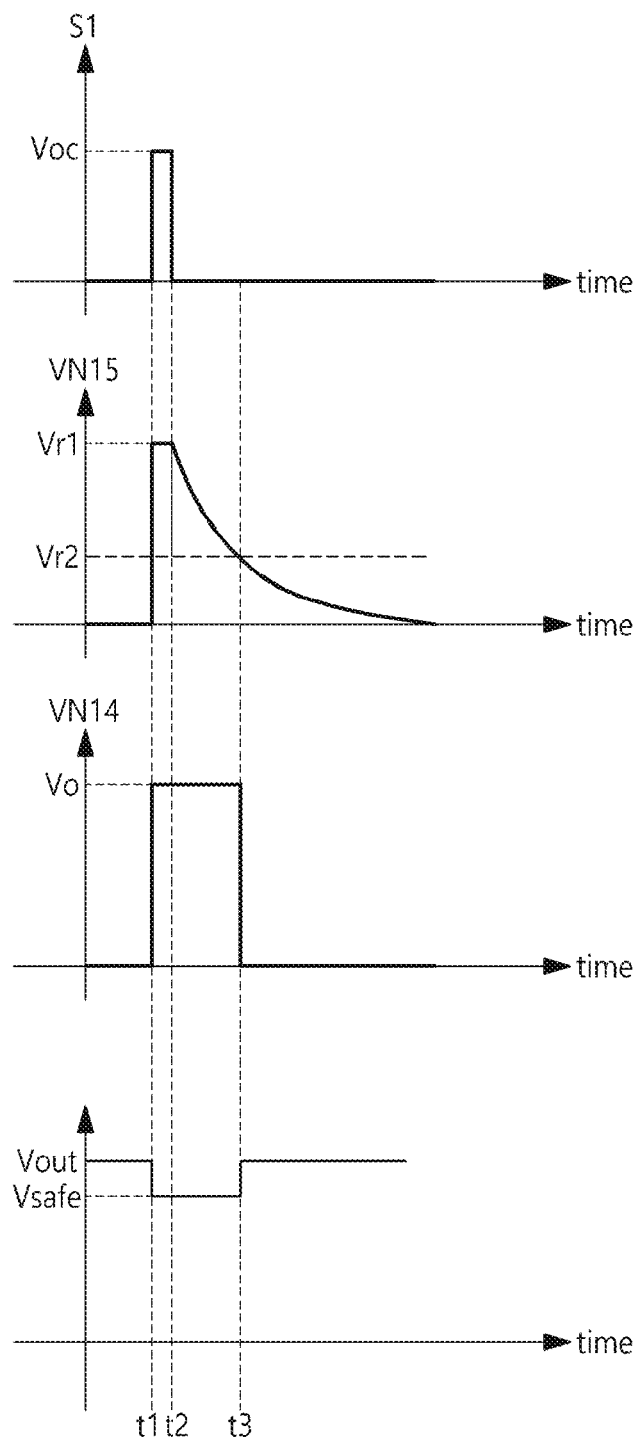
FIG. 8 is an example waveform which appears when a safe mode driving circuit according to embodiments of the present disclosure is driven.

FIG. 7 is an example diagram of a direct current voltage converter 310 operating in a safe mode according to embodiments of the present disclosure. FIG. 8 is an example waveform which appears when a safe mode driving circuit according to embodiments of the present disclosure is driven.

As shown in FIG. 7, the DC voltage converter may include a first transistor 741, a first diode 751, a first inductor 761, and a first capacitor 771. The DC voltage converter shown in FIG. 7 may be the same as the DC voltage converter shown in FIG. 6.

As shown in FIG. 7, the feedback circuit 320 may include a resistance control circuit 780, a first resistor 711, an amplifier 721, and a feedback signal output circuit 731. The feedback circuit 320 shown in FIG. 7 may be the same as the feedback circuit 320 shown in FIG. 6.

As shown in FIG. 7, the resistance control circuit 780 may include a second resistor 712, a second transistor 742, and a third resistor 713. The resistance control circuit 780 shown in FIG. 7 may be the same as the resistance control circuit 680 shown in FIG. 6.

As shown in FIG. 7, the safe mode driving circuit 790 may include a comparator circuit 691, a driving time control circuit 692, and a safe mode initiation circuit 692.

As shown in FIG. 7, the safe mode initiation circuit 692 may include a ninth resistor 719 and a switch 745.

As shown in FIG. 7, the ninth resistor 719 may be electrically connected between a fifteenth node N15 and a sixteenth node N16.

As shown in FIG. 7, the switch 745 may be electrically connected between the sixteenth node N16 and a seventeenth node N17.

As shown in FIG. 7, the third input voltage Vin3 may be supplied to the seventeenth node N17. The switch 745 may receive an overcurrent pulse signal S1. The switch 745 may be turned on in response to receive the overcurrent pulse signal S1, which is a high level signal.

As shown in FIG. 8, the overcurrent pulse signal S1 may change from a low level signal to a high level signal Voc at a first time point t1. From the first time point t1 to a second time point t2, the overcurrent pulse signal S1 may be in a high level signal Voc state. That is, the switch 745 may be turned on from the first time point t1 to the second time point t2. As the switch 745 is turned on, the third input voltage Vin3 can be supplied to the sixteenth node N16. The third input voltage Vin3 may be stepped-down or dropped by a ninth resistor 719. In this case, the dropped third input voltage Vin3 may be a first reference voltage Vr1. The first reference voltage Vr1 may be supplied to the fifteenth node N15.

As shown in FIG. 7, the driving time control circuit 692 may include an eighth resistor 718 and a second capacitor 722.

As shown in FIG. 7, the eighth resistor 718 may be electrically connected between the fifteenth node N15 and a ground node.

As shown in FIG. 7, the second capacitor 722 may be electrically connected between the fifteenth node N15 and the ground node.

As shown in FIG. 8, before the first time point t1, a voltage VN15 of the fifteenth node may be in a ground voltage state. The voltage VN15 of the fifteenth node from the first time point t1 to the second time point t2 may be the first reference voltage Vr1. After the second time point t2, the voltage level of the first reference voltage Vr1 may decrease. The decreased voltage VN15 of the fifteenth node may become a second reference voltage Vr2 at a third time point t3. The second reference voltage Vr2 may be smaller than the first reference voltage Vr1. After the third time point t3, the voltage VN15 of the fifteenth node may continue to decrease and become lower than the second reference voltage Vr2. The voltage level of the second reference voltage Vr2 may be the same as a safe mode reference voltage level.

Since the eighth resistor 718 and the second capacitor 722 form an RC circuit, the voltage VN15 of the fifteenth node may be decreases by drawing an RC Delay curve. The time for the voltage VN15 of the fifteenth node to decrease from the first reference voltage Vr1 to the second reference voltage Vr2 may be as long as a time constant. The time constant may be a value obtained by multiplying a resistance value of the eighth resistor 718 and a capacitance of the second capacitor 722.

That is, as shown in FIG. 8, from the first time point t1 to the third time point t3, the driving time control circuit 692 may maintain the voltage VN15 of the fifteenth node greater than the second reference voltage Vr2.

As shown in FIG. 7, the comparator circuit 691 may include a fourth resistor 714, a fifth resistor 715, a sixth resistor 716, a seventh resistor 717, and an amplifier 722.

As shown in FIG. 7, the fourth resistor 714 may be electrically connected between the twelfth node N12 and a fourteenth node N14.

As shown in FIG. 7, the fifth resistor 715 may be electrically connected between the twelfth node N12 and the ground node.

As shown in FIG. 7, the sixth resistor 716 may be electrically connected between a seventeenth node N17 and a thirteenth node N13.

As shown in FIG. 7, the seventh resistor 717 may be electrically connected between the thirteenth node N13 and the ground node.

As shown in FIG. 7, the amplifier 722 may include a non-inverting terminal Np2, an inverting terminal Nn2, and an output terminal No2. The non-inverting terminal Np2 of the amplifier 722 may be electrically connected to the thirteenth node N13. The inverting terminal Nn2 of the amplifier 722 may be electrically connected to the fifteenth node N15.

As shown in FIG. 7, the amplifier 722 may be operated as a comparator circuit 691. The amplifier 722 may compare the voltage of the thirteenth node N13 and the voltage of the fifteenth node N15. The amplifier 722 may output a comparison signal Vo according to the comparison result to the output terminal No2.

As shown in FIG. 7, the sixth resistor 716 and the seventh resistor 717 may be connected in series between the seventeenth node N17 and the ground node. Therefore, the voltage corresponding to the voltage difference between the seventeenth node N17 and the ground node may be distributed to each of the sixth resistor 716 and the seventh resistor 717 according to a voltage distribution principle. When the third input voltage Vin3 is supplied to the seventeenth node N17, the voltage of the thirteenth node N13 may be a voltage based on the third input voltage Vin3. The voltage of the thirteenth node N13 may be a fixed voltage. In this case, the voltage of the thirteenth node N13 may be a reference voltage in the comparator circuit 691. The voltage of the thirteenth node N13 may be a fourth input voltage Vin4.

As shown in FIG. 8, if the voltage of the fifteenth node N15 is less than the second reference voltage Vr2, the comparator circuit 691 may output a comparison signal Vo of a low level signal. If the voltage of the fifteenth node N15 is greater than the second reference voltage Vr2, the comparator circuit 691 may output a comparison signal Vo of a high level signal. The comparison signal Vo may be current or voltage.

As shown in FIG. 7, the fourth resistor 714 and the fifth resistor 715 may be connected in series between the fourteenth node N14 and the ground node. Therefore, the voltage corresponding to the voltage difference between the fourteenth node N14 and the ground node may be distributed to each of the fourth resistor 714 and the fifth resistor 715 according to the voltage distribution principle. If the comparison signal Vo is a voltage, the voltage of the thirteenth node N13 may be a voltage based on the comparison signal Vo. The voltage of the thirteenth node N13, which is a voltage based on the comparison signal Vo, may be a safe mode signal S2. If the comparison signal Vo is a high level signal, the safety mode signal S2 may also be a high level signal.

As shown in FIG. 7, as the safety mode signal S2 of a high level signal is supplied to a gate node of the second transistor 742, the second transistor 742 may be switched to the turn-on state. Accordingly, the third resistor 713 may be electrically connected between the fifth node N5 and the sixth node N6. The resistance value between the fifth node N5 and the sixth node N6 may be decreased. As the resistance value between the fifth node N5 and the sixth node N6 decreases due to the parallel connection, the voltage across the first resistor 711 may be relatively increased. The relatively large voltage across both ends of the first resistor 711 may be supplied to the non-inverting terminal Np1 of the amplifier 721.

The comparison signal may be output to the output terminal No1 based on the relatively large voltage across both ends of the first resistor 711, and based on the above-described comparison signal, the feedback signal output circuit 731 may output a control signal which is a PWM signal with a relatively low duty ratio.

Accordingly, the DC voltage converter may output a relatively lower output voltage Vout. As shown in FIG. 8, the safe mode may be operated from the first time t1 to the third time t3, and the voltage output from the DC voltage converter may be a safe mode voltage Vsafe.

Figure 9:
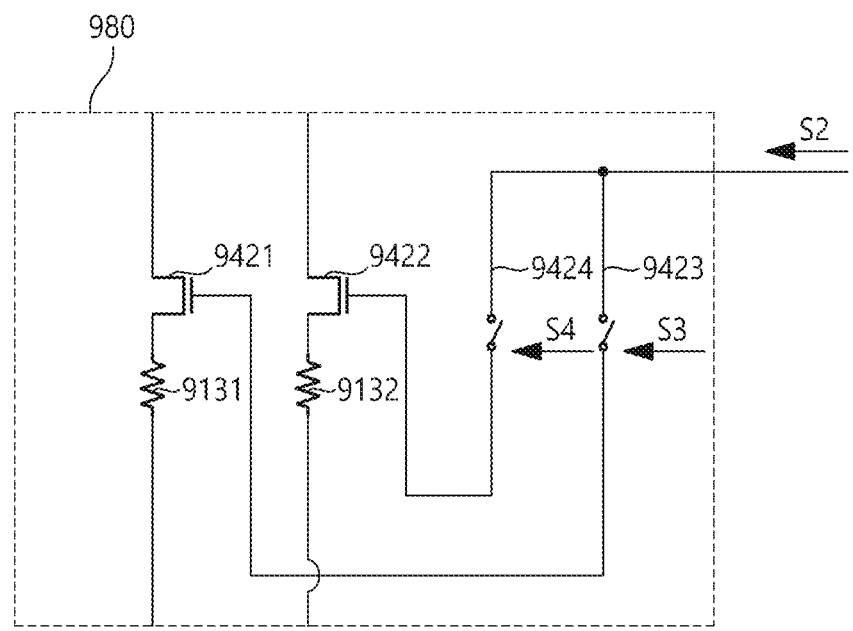
FIG. 9 illustrates a resistance control circuit according to embodiments of the present disclosure.

FIG. 9 illustrates a resistance control circuit 980 according to embodiments of the present disclosure.

As shown in FIG. 7, the resistance control circuit 780 may include a second transistor 742 and a third resistor 713 connected in series. A circuit in which the second transistor 742 and the third resistor 713 are connected in series may be called a "resistance control group."

As shown in FIG. 9, there is illustrated another example of the resistance control circuit 780 shown in FIG. 7.

As shown in FIG. 9, the resistance control circuit 980 may include two or more resistance control groups. As the resistance control circuit 980 includes two or more resistance control groups, a magnitude of the safe mode voltage Vsafe may be adjusted in various ways. The safe mode voltage Vsafe may be a voltage output from the DC voltage converter 310 when operated in safe mode.

As shown in FIG. 9, the resistance control circuit 980 may include a second transistor 9421 connected in series with a resistor 9131 and a third transistor 9422 connected in series with a resistor 9132.

A gate node of the second transistor 9421 may be electrically connected to a first switch 9423. The first switch 9423 may be controlled by the first switch control signal S3.

A gate node of the third transistor 9422 may be electrically connected to a second switch 9424. The second switch 9424 may be controlled by a second switch control signal S4.

The second transistor 9421 and the third transistor 9422 may each be controlled according to the switch control signal. Therefore, the resistance value between the fifth node N5 and the sixth node N6 may be adjusted in various ways.

Two resistance control groups are shown in FIG. 9, but there may be three or more resistance control groups, and in this case, the resistance value may be adjusted in various ways.

Figure 10:
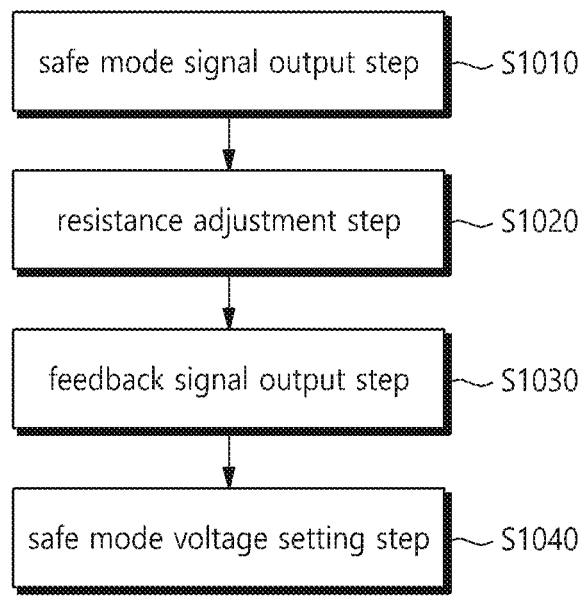
FIG. 10 is a flowchart of a driving method of a display device driven in a safe mode according to embodiments of the present disclosure.

FIG. 10 is a flowchart of a driving method of a display device 100 driven in a safe mode according to embodiments of the present disclosure.

The driving method of the display device may include a safe mode signal output step S1010, a resistance adjustment step S1020, a feedback signal output step S1030, and a safe mode voltage setting step S1040.

The safe mode signal output step S1010 may be a step in which the safe mode driving circuit outputs a safe mode signal after receiving an overcurrent pulse signal.

The resistance adjustment step S1020 may be a step for adjusting a resistance value of the resistance control circuit receiving the safety mode signal.

The feedback signal output step S1030 may be a step in which a feedback circuit including the resistance control circuit outputs a feedback signal.

The safe mode voltage setting step S1040 may be a step in which the DC voltage converter that receives the feedback signal lowers or steps-down the voltage level of the output voltage.

Embodiments of the present disclosure described above are briefly described as follows.

Embodiments of the present disclosure may provide a power management circuit including a direct current voltage converter 310 configured to generate an output voltage based on a first input voltage and outputs the output voltage to an output node, and a feedback circuit configured to generate a feedback signal based on the output voltage output to the output node, wherein the feedback circuit includes an amplifier for comparing a second input voltage supplied to a first input terminal and a voltage supplied to a second input terminal and outputting a first comparison signal; a feedback signal output circuit configured to output a feedback signal based on the first comparison signal, and a resistance control circuit electrically connected between the first input terminal and the output node, wherein the resistance control circuit adjusts a resistance value between the first input terminal and the output node based on a safe mode signal.

The resistance control circuit may include a first resistor electrically connected between the first input terminal and the output node, and a first transistor and a second resistor connected in series between the first input terminal and the output node.

After the safe mode signal of a high level signal is supplied to a gate node of the first transistor, the second resistor may be electrically connected between the first input terminal and the output node.

The resistance control circuit may lower the resistance value between the first input terminal and the output node when the safe mode signal changes from a low level signal to the high level signal.

The resistance control circuit may further include a second transistor and a third resistor connected in series between the first input terminal and the output node.

A safe mode driving circuit may output the safe mode signal of a high level signal after receiving an overcurrent pulse signal.

The safe mode driving circuit may include a safety mode initiation circuit for receiving the overcurrent pulse signal, a driving time control circuit for generating a driving time control signal when the safe mode initiation circuit is turned on, and a comparator circuit for comparing the driving time control signal and a reference voltage and outputting the safe mode signal.

The comparator circuit may output the safe mode signal of the high level signal when a voltage level of the driving time control signal is greater than a specific reference value.

The feedback signal output circuit may adjust a duty ratio of the feedback signal based on the first comparison signal.

The direct current voltage converter may lower a voltage level of the output voltage based on the feedback signal.

The direct current voltage converter may be a buck converter.

A load electrically connected to the direct current voltage converter may be supplied with the output voltage from the direct current voltage converter.

The load may be a load in which overcurrent occurs.

Embodiments of the present disclosure may provide a display device including a display panel on which a plurality of subpixels are disposed, and a power management circuit configured to supply power to the subpixel. In this case, the power management circuit may include a direct current voltage converter configured to generate an output voltage based on a first input voltage and outputs the output voltage to an output node, and a feedback circuit configured to generate a feedback signal based on the output voltage output to the output node. The feedback circuit may include an amplifier for comparing a second input voltage supplied to a first input terminal and a voltage supplied to a second input terminal and outputting a first comparison signal, a feedback signal output circuit configured to output a feedback signal based on the first comparison signal, and a resistance control circuit electrically connected between the first input terminal and the output node. The resistance control circuit may adjust a resistance value between the first input terminal and the output node based on a safe mode signal.

The display panel may be a vehicle display panel.

The resistance control circuit may include a first resistor electrically connected between the first input terminal and the output node, and a first transistor and a second resistor connected in series between the first input terminal and the output node.

A safe mode driving circuit may output the safe mode signal of a high level signal after receiving an overcurrent pulse signal.

The safe mode driving circuit may include a safety mode initiation circuit for receiving the overcurrent pulse signal, a driving time control circuit for generating a driving time control signal when the safe mode initiation circuit is turned on, and a comparator circuit for comparing the driving time control signal and a reference voltage and outputting the safe mode signal.

The direct current voltage converter may lower a voltage level of the output voltage based on the feedback signal.

Embodiments of the present disclosure may provide a driving method of a display device including outputting a safe mode signal, by a safe mode driving circuit, after receiving an overcurrent pulse signal, adjusting a resistance value, by a resistance control circuit receiving the safe mode signal, outputting a feedback signal, by a feedback circuit including the resistance control circuit, and lowering a voltage level of an output voltage, by a direct current voltage converter supplied with the feedback signal.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

What is claimed is:

1. A power management circuit, comprising:
   a direct current voltage converter configured to generate an output voltage based on a first input voltage and to output the output voltage to an output node; and
   a feedback circuit configured to generate a feedback signal based on the output voltage output to the output node,
   wherein the feedback circuit comprises:
       an amplifier configured to compare a second input voltage supplied to a first input terminal and a voltage supplied to a second input terminal and to output a first comparison signal;
       a feedback signal output circuit configured to output a feedback signal based on the first comparison signal; and
       a resistance control circuit electrically connected between the first input terminal and the output node, and
   wherein the resistance control circuit is configured to adjust a resistance value between the first input terminal and the output node based on a safe mode signal.

2. The power management circuit of claim 1, wherein the resistance control circuit comprises:
   a first resistor electrically connected between the first input terminal and the output node; and
   a first transistor and a second resistor connected in series between the first input terminal and the output node.

3. The power management circuit of claim 2, wherein, after the safe mode signal of a high level signal is supplied to a gate node of the first transistor, the second resistor is electrically connected between the first input terminal and the output node.

4. The power management circuit of claim 3, wherein the resistance control circuit is further configured to lower the resistance value between the first input terminal and the output node when the safe mode signal changes from a low level signal to the high level signal.

5. The power management circuit of claim 2, wherein the resistance control circuit further includes a second transistor and a third resistor connected in series between the first input terminal and the output node.

6. The power management circuit of claim 1, further comprising a safe mode driving circuit configured to output the safe mode signal of a high level signal after receiving an overcurrent pulse signal.

7. The power management circuit of claim 6, wherein the safe mode driving circuit comprises:
   a safety mode initiation circuit configured to receive the overcurrent pulse signal;
   a driving time control circuit configured to generate a driving time control signal when the safe mode initiation circuit is turned on; and
   a comparator circuit configured to compare the driving time control signal and a reference voltage and to output the safe mode signal.

8. The power management circuit of claim 7, wherein the comparator circuit is further configured to output the safe mode signal of the high level signal when a voltage level of the driving time control signal is greater than a specific reference value.

9. The power management circuit of claim 1, wherein the feedback signal output circuit is further configured to adjust a duty ratio of the feedback signal based on the first comparison signal.

10. The power management circuit of claim 1, wherein the direct current voltage converter is further configured to lower a voltage level of the output voltage based on the feedback signal.

11. The power management circuit of claim 1, wherein the direct current voltage converter is a buck converter.

12. The power management circuit of claim 1, wherein the direct current voltage converter is further configured to supply the output voltage to a load electrically connected to the direct current voltage converter.

13. The power management circuit of claim 12, wherein the load is a load in which overcurrent occurs.

14. A display device, comprising:
    a display panel including a plurality of subpixels; and a power management circuit configured to supply power to the subpixels, wherein the power management circuit comprises:

a direct current voltage converter configured to generate an output voltage based on a first input voltage and to output the output voltage to an output node; and a feedback circuit configured to generate a feedback signal based on the output voltage output to the output node, wherein the feedback circuit comprises:

an amplifier configured to compare a second input voltage supplied to a first input terminal and a voltage supplied to a second input terminal and to output a first comparison signal;

a feedback signal output circuit configured to output a feedback signal based on the first comparison signal; and a resistance control circuit electrically connected between the first input terminal and the output node, and wherein the resistance control circuit is configured to adjust a resistance value between the first input terminal and the output node based on a safe mode signal.

15. The display device of claim 14, wherein the display panel is a vehicle display panel.

16. The display device of claim 14, wherein the resistance control circuit comprises:

a first resistor electrically connected between the first input terminal and the output node; and a first transistor and a second resistor connected in series between the first input terminal and the output node.

17. The display device of claim 14, wherein the power management circuit further comprises a safe mode driving circuit configured to output the safe mode signal of a high level signal after receiving an overcurrent pulse signal.

18. The display device of claim 17, wherein the safe mode driving circuit comprises:

a safety mode initiation circuit configured to receive the overcurrent pulse signal;

a driving time control circuit configured to generate a driving time control signal when the safe mode initiation circuit is turned on; and a comparator circuit configured to compare the driving time control signal and a reference voltage and to output the safe mode signal.

19. The display device of claim 14, wherein the direct current voltage converter is further configured to lower a voltage level of the output voltage based on the feedback signal.

20. A driving method of a display device, comprising:

outputting a safe mode signal, by a safe mode driving circuit, after receiving an overcurrent pulse signal;

adjusting a resistance value, by a resistance control circuit receiving the safe mode signal;

outputting a feedback signal, by a feedback circuit including the resistance control circuit; and lowering a voltage level of an output voltage, by a direct current voltage converter supplied with the feedback signal.

\* \* \* \* \*